INVENTOR
R. Lee Hollingsworth

VIDEO TAPE RECORDING

Filed June 17, 1959 2 Sheets-Sheet 2

INVENTOR

R. Lee Hollingsworth

United States Patent Office 3,160,704

Patented Dec. 8, 1964

3,160,704

VIDEO TAPE RECORDING

R. Lee Hollingsworth, Massapequa, N.Y.
(514 Hempstead Ave., West Hempstead, N.Y.)

Filed June 17, 1959, Ser. No. 820,990
3 Claims. (Cl. 178—6.6)

The present invention relates to magnetic recording. Generally, the invention comprises means for continuously recording and reading out information from a magnetic ink emulsion printed on strip or tape, where areas are left blank and other areas are printed with said magnetic ink or magnetic emulsion. An elongated electromagnetic gap of a record-readout head angularly bridges from one transverse magnetic line to the next, providing magnetic material continuity of recording and for reading out information so recorded. In this manner an effective elongation of recording media is provided.

The invention comprises basically the process of printing of fine bars or lines of magnetizable material across a relatively broad tape made of plastic, paper or other suitable carrier material in tape roll form or a drum carrier arrangement, and record-readout equipment to angularly magnetic bridge one line to the next with tape movement.

On the same tape carrier medium, bars and lines are also printed (printing press not illustrated, being one of common usage generally), to generate energy for television horizontal line and frame representations so that when the tape is moved over magnetic pickup heads, the impulse waves so generated, are supplied to a television camera tube; to a television reproducing cathode ray tube; for other functions; to provide the vertical picture framing, and for producing the horizontal lines within each frame of the presentation, and to provide retrace blanking for both the television camera tube and television reproducing tube.

At a delayed time after the recording is made, when the video presentation is reproduced again and again, the same printed bars and lines, or configurations, supply the synchronizing wave energy for proper reproduction to the television reproducing tube, as the bars or lines pass over their respective electromagnetic pickup heads, thus prepared tape comprises an integral part of the transverse recording and reproducing mechanism.

Recording tape so prepared by this programmed printing should increase the activity of taking home television recordings of family scenes and the like, and recordings directly from a home received television presentation for delayed viewing or study. This system will greatly increase the amount of library material to be rented to home television viewers in both the entertainment and educational fields, without the home owner being required to provide costly synchronizing equipment, since the complete generation of the synchronizing facility is contained on the magnetically printed tape.

Therefore, one purpose of the present invention is to provide a high resolution, simplified, inexpensive system for video magnetic recording and reproduction, as well as for long playing voice and music recording, or a recording medium capable of storing large volumes of information which can be telemeter-selected and read out or reproduced as desired.

Another purpose of the invention is to include upon the carrier strip or tape, constant spaced printed bars, dots or the like to be used for synchronizing apparatus associated with the recording, such as a television camera, television reproducing tube, counters and tape positioning equipment and other related functions associated with a typical version of this system of recording and reproduction and related functions.

The description of my invention follows, wherein like parts in the drawings are identically numbered. Associated apparatus such as thyratron power control units, amplifiers, wave shaping equipment, delay lines, blanking equipment, limiters, equalizers and switching units are illustrated in block diagram form.

Figure 1:
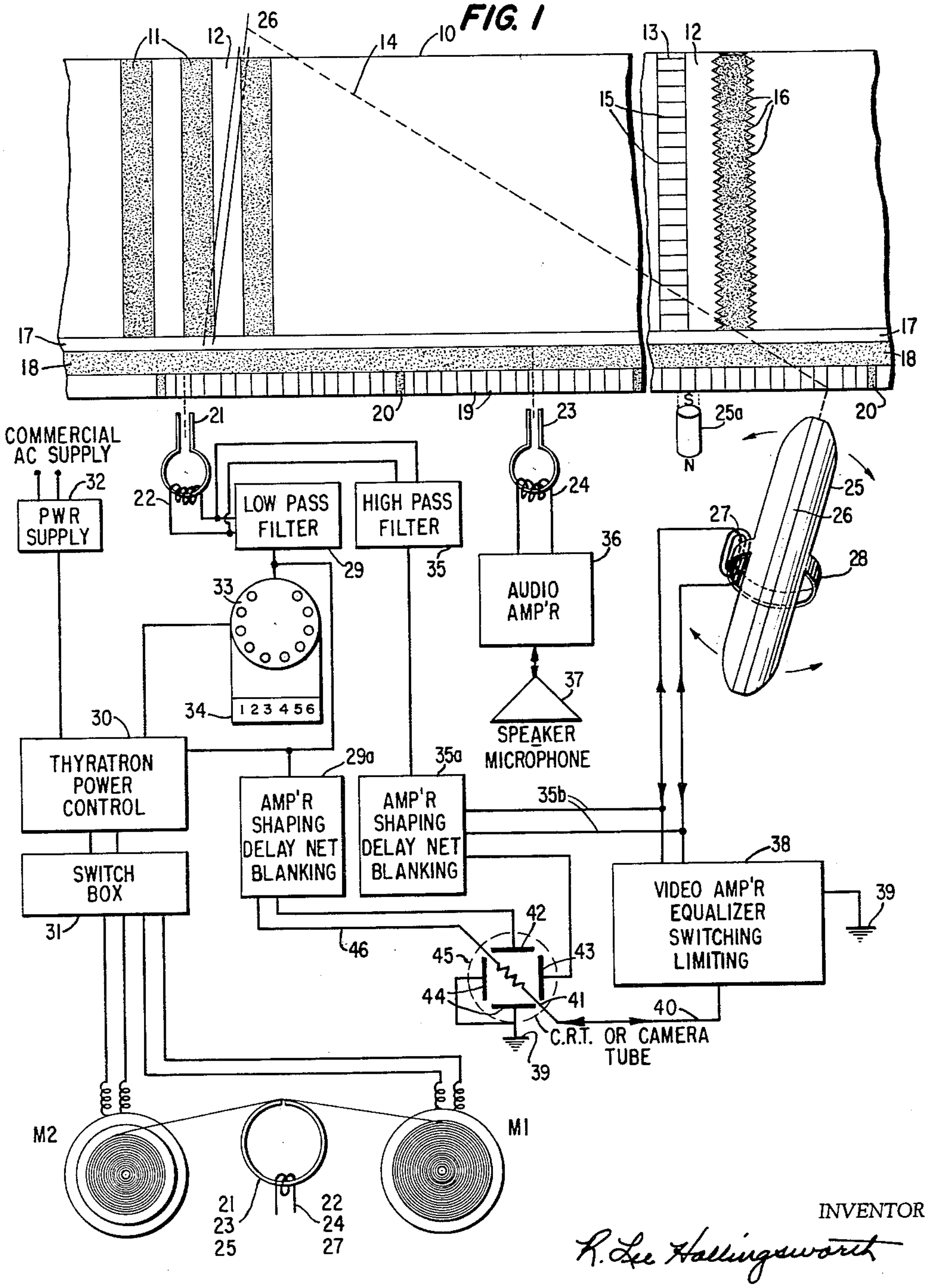
FIGURE 1 shows a combinational schematic and block diagram of the essential equipment of the invention including the magnetic carrier or tape, the readout-record heads and other associated equipment.

In FIGURE 1, the tape or carrier medium is indicated at 10. Printed bars or lines of configuration on tape 10 for video frequency recording is indicated at 11, while the space between lines 11 having no magnetizable material thereon is indicated at 12. Another type of bar or line is shown at 13, wherein the video wave is broken up into fine dots 15, or is broken up or modulated with tape movement by the saw-tooth like perforations indicated by 16. The width of these lines and the space therebetween are illustrated greatly enlarged. Between the area of bars 11 and the solidly printed sound strip area 18, there is preferably a separation strip 17 of a desirable width to allow pivotable movement of the record-readout head 25 as indicated by the arrows associated with the drawing of the head. Horizontal magnetizable lines or bars, or dots or configurations for the generation with tape movement of wave energy pulses are shown at 20 for television camera and reproducing tube picture framing, while the bars or lines 19 generate the horizontal line scanning wave energy for the lateral beam control of television cameras and television reproducing tubes. Retrace blanking voltage may be also derived from the same, or another pickup head (not shown) associated with pre-printed retrace lines or bars, printed on the same carrier tape in correct spaced relationship to printed bars 19. The printed lines 19 and 20 may be also utilized for retrace blanking, by passing the wave energy through a wave shaper to shorten its length and through a delay line to provide the correct blanking voltage at the proper time after each horizontal line has traversed the face of the television camera or reproducing tube, and blanking of the beam's retrace between frames.

Pickup head 21, with coil winding 22 picks up the synchronizing energy pulses due to the passage of lines 19 and 20 on tape 10, and delivers them to the low pass filter 29 which passes only the energy generated by bars 20, and the output of filter 29 is connected to the amplifier-shaping-blanking unit 29*a*, and thence to the cathode ray tube 45 and its vertical deflection plate 42, via lead 46 to a beam intensity control grid 41. Pickup head coil 22 also delivers its output to high pass filter 35, and thence to amplifier-shaper-blanking unit 35*a*, the output of which delivers horizontal blanking energy via connections 35*b* to the input of video amplifier 38. The output of the low pass filter is also connected to telemeter dial unit 33 having a built-in counter 34 that is responsive to the pulses generated by lines 20 on tape 10, and this dial is utilized for selecting positions on the tape for listening or viewing, or to visually read out information when tape 10 is utilized for calculating machine or computer uses. The output from the low pass filter is also connected to control thyratron power control unit 30 via switch box unit 31 from commercial A.C. current supply 32, to supply motors M1 and M2 with both driving power and braking power. The switching arrangement in box 31 is set forth in the description of FIGURE 3. Telemeter units 33 and 34 are well known items in the field of telemetering, and are here used in combination with the pulses generated by the movement of printed bars 19 on tape 10, which make their appearance over the recording head usually less than fifty times each second. It is to be appreciated that a great number of synchronously related pieces of equipment can be continuously operated and controlled in accordance with the movement of a mechanical operational program, operated by this printed tape, and all, or a portion of the entire program operation may be synchronously and simultaneously viewed on a television tube in one or more locations.

Record-readout head 23 records or picks up sound and intelligence along magnetic material printed strip 18; passes same into audio amplifier 36 which delivers same to the loud speaker 37 in the usual manner. Speaker 37 also represents a microphone when same is connected to the input of audio amplifier 36 and the output thereof is connected to record-readout coil 24.

Video recording head unit 25 is positioned under the tape 10 as shown, and in the offset view indicated by dotted line 14. A thin gap separator 26 is comprised of non-magnetic material such as will withstand excessive wear, and prevent the collection of magnetic particles from being trapped in the record-readout head gap area. The video record-readout coil winding is shown at 27, and 28 represents the horse shoe portion of the magnetizable head unit which is constructed of material such as Mu-metal or the likes thereof. The output winding 27 is connected to video amplifier unit 38, which contains equalizer units as required, switching mechanisms for reversing the direction of energy from, or to the record-readout head 25, and limiters for controlling the energy during recording and during readout to minimize video level variations in so far as possible. The type of modulation used with, or in any part of this system of recording, whether it be amplitude, frequency or phase, is immaterial, however a carrier wave frequency modulated may be preferred for video recording via head unit 25. The construction of head 25 lends itself to the use of high power application with any type of video frequency modulation, and, it is a paramount feature of the invention to be able to supply windings 27 of head 25, with unusually high power to insure faithful recording over a wide frequency range. All equipment normally required to be commonly grounded is so connected as indicated at 39. The vertical beam control action of cathode ray tube 45 is provided by deflection plate 42, while the horizontal control of the cathode ray tube beam is provided by plate 43, while the two opposite control plates 44 are connected in the usual manner to common ground potential. The power supply control unit 30 is preferably supplied with direct current, or the power source is derived from the usual 60 cycle commercial source 32. The motors M1 and M2, also have provided preferably an A.C. starting device (not shown) for starting the tape reel movement quickly, which preferably has a throwout switch to operate at the time the low pass filter delivers from the moving tape, the proper frequency through the thyratrons to correspond to the natural and correct frequency for the speed of M1 and M2. This action of the thyratrons supplying the correct frequency to the synchronous motors comprises a regenerative feedback arrangement from the pulse through the thyratron, which looks through the winding of the synchronous motor M1 or M2 with maximum driving power when the frequency from the tape is a small portion of a cycle faster than the natural frequency of appearance of the windings. The thyratrons release a bit more power than is actually required to drive M1 or M2 at the correct speed and against the drag of the braking motor function, which provides a lock-in factor to insure against hunting variations in the driven tape. A fly-wheel—not shown—may be utilized to further smooth the tape movement as to mechanical drive ripple past the recording-readout heads where needed. As the drive power generated by one of pulses 20, produces a certain movement of the tape, the next in line of pulses 20 applies the motors with another cycle of power via the thyratron unit 30, thus providing this electronic regenerative drive effect of this invention.

The equipment shown in FIGURE 1 identified as amplifiers, equalizers, limiters, shapers, blanking, low pass filters, high pass filters, and delay networks are standard or known units, or known circuits, and these devices are not detailed herein for simplicity of illustration and of description, since they each perform well known functions.

Before video recording takes place, lines 11, 15 and 16 may be passed under the influence of a steady magnetic field to improve the efficiency of recording.

By reversing circuits in the system, the energy may be made to flow to or from the tape for operating the system as a recorder or as a reproducer.

It should be thoroughly understood that the accurate, mechanical printing or programming of the tape, is one of the more important features of the present invention. Once a printing press, perforator, or programmer machine (not illustrated) is setup to print all of the lines and characters in perfect relationship on the tape, large quantities of tape can be produced economically for use in the apparatus of this invention. Pickup head 21 may contain a degree of permanent magnetism to improve the efficiency as a generator, as lines 19 and 20 pass over gaps 21. During the printing of lines 19 and 20, and perhaps later to vitalize the magnetism therein, these lines are preferably passed through the influence of a steady state magnetic field as shown at 25*a* to improve the efficiency of electric generation.

Figure 2:
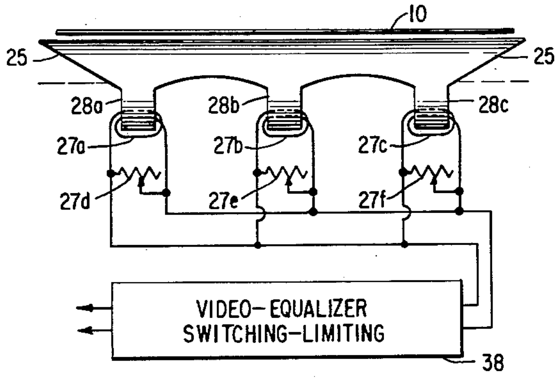
FIGURE 2 shows a preferred embodiment of a video record-readout head wherein a multiplicity of windings supply the same video energy to various parts of the head, with adjustments to insure uniformity of magnetic pulsations in all parts of the head gap and, to insure uniformity of magnetic pulsations along the gap, to or from the carrier tape. An end view of this head is shown by FIGURE 2*a*.

FIGURE 2 shows a modification of record-readout head 25, wherein the horse shoe area of the magnetizable material of the head, is milled out and divided into two or more separate magnetically parallel coil winding or coil holding areas 28*a*, 28*b* and 28*c* as here illustrated, each being fed with the same common video frequency energy from the video frequency amplifier 38 and in equal amounts via coils 27*a*, 27*b* and 27*c* by proper adjustment of attenuators 27*d*, 27*e* and 27*f* when required to insure that equal amounts of magnetic flux change takes place along the length of the recording gap 26 with each video impulse. On readout however, it is to be appreciated, that any variations in the recording of the video energy, are smoothed and equalized by limiting within the readout circuits. This multiplicity of magnetic gap feed paths is not to be confused with known divided magnetic circuits within a magnetic record-readout head unit for the purpose of feeding one section with high frequency energy, and another section with low frequency energy to effect frequency bandwidth equalization within the recording head and windings, however this construction is readily adaptable for this use and it is so anticipated and a part of the present invention for general use in the recording field, because the construction lends itself to high power application to insure faithful record-readout functions.

Figure 2A:
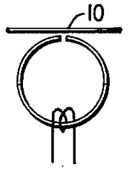

It is to be further appreciated that this type of record-readout head construction, when used in conjunction with printed impulses, or completely coated magnetic recording tape, with telemeter selectors for positioning the tape 10 automatically, lends itself to great utility in storing and reading out large volumes of data and information, such as used in computing machines, bookkeeping machines, visual readout on television tubes, vocal library information and the like. An end view of the head construction is shown in FIGURE 2*a*.

Figure 3:
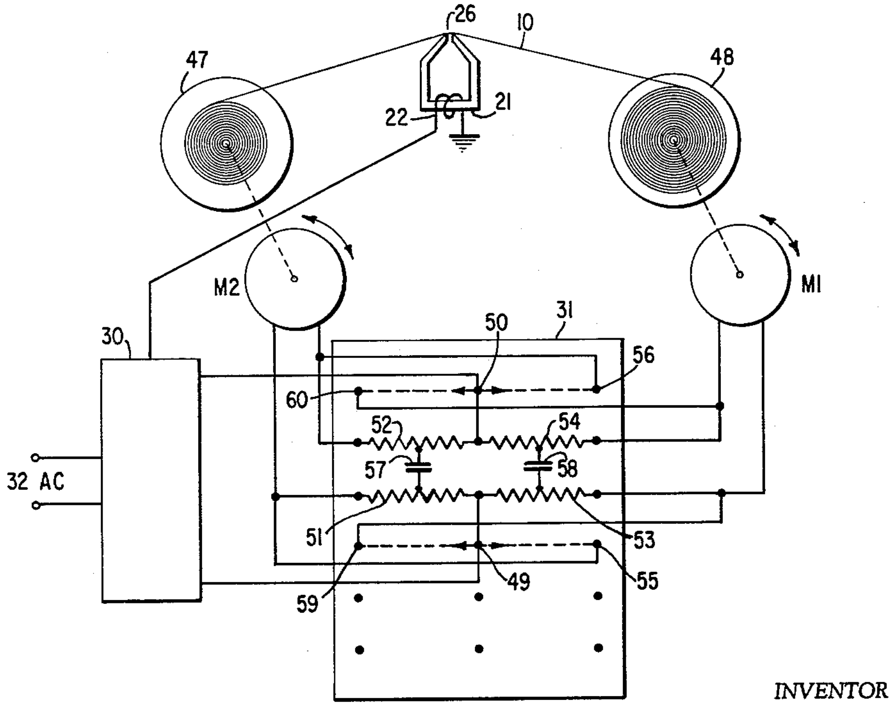
FIGURE 3 shows a schematic view of the tape transport system, wherein two motors are used, one for drive and the other for drag and vice-versa, through a switching arrangement, to improve and simplify tape handling, and to keep the tape under positive control at all times.

Pre-printed magnetic lines or bars of the type herein described, including configurations as desired, may be printed in lines on the tape in linear relation, or to represent mathematical variable quantities related to tape movement, providing a computer or calculating machine with tape to include direct readout of the results on a digital indicator or on a cathode ray tube. Tape reels 47 and 48 pass the tape 10 over recording gap 26 of recording head 21, as it is driven and controlled by motors M1 and M2. In FIGURE 3, the A.C. supply 32 is connected to thyratron control unit 30, which is under the control of the synchronous pulses generated by printed lines 20 on moving tape 10. The output of the control unit 30 is fed to the center contacts 49 and 50 of double pole double throw switch unit 31. In operation, when the power is connected to control unit 30, and the DPDT switch is open, low current is delivered through resistances 51, 52, 53 and 54, that in a sense freezes M1 and M2 motionless. When DPDT switch is thrown to the right to energize or engage contacts 55 and 56 with contacts 49 and 50, motor M2 turns tape reel 47 against the electromagnetic tension still connected to motor M1 through resistances 53 and 54. Condensers 57 and 58 filter to a degree the current leading to the motor performing the braking action to allow smooth brake release action to the motor doing the driving, thus allowing smooth braking control action to the motor doing the driving, thus allowing the smooth braking action to keep the tape 10 always under positive control on starts, runs and stops. Throwing switch 31 to engage contacts 59 and 60 with contacts 49 and 50 moves the tape in the opposite direction with motor M2 performing the braking action while M1 provides the winding power to move tape 10 across representative gap 26. The output of coil 22 is shown connected to the thyratron power control unit 30 and operates as heretofore explained, namely in regenerative fashion in conjunction with the printed magnetic lines 20 on the tape 10.

The overall operation of the invention is basically as follows: The tape reels 47 and 48 are loaded with a reel of tape having the required magnetic printing thereon. Switch 31 of FIGURE 3 is thrown to move the tape in the proper direction across the recording heads. If the purpose be to record intelligence such as a television signal, a television camera tube is added or substituted for the cathode ray tube 45 preferably by switching, (not shown) and the direction of the video amplifier is reversed to deliver camera energy to recording coil 27. The audio circuit is reversed to record. With the movement of the tape, M1 and M2 function to move and handle the tape in smooth, constant motion fashion; the telemeter dial is set to record a given length of tape; the television camera sweep circuits are energized by the wave energy generated by lines 19 and 20, and the video frequency energy from the camera tube is recorded along the transverse printed lines 11 which are bridged from one to the other by gap 25 being adjusted as indicated by arrows to best perform this magnetic bridging function from the line instantly traversed to the next line on the tape. On reproduction of the recording, the tape is first rewound (by a fast auxiliary motor preferably (not shown)); a television reproducing tube is substituted for the camera tube and the video and audio circuits are reversed; switch 30 is again thrown to move the tape in the same direction as during the recording. The picture is viewed in exact synchronism with the originally printed lines 19 and 20, and with video head 25 thence to the cathode ray tube.

The printing process herein referred to comprises the setting up of a printing press (not shown), which simulates a programming machine to print the magnetizable ink on the tape at a constant repetitive rate as the tape moves at substantially constant speed.

When the television recording tape of usual utility has all of the synchronizing signals pre-recorded thereon at a television studio, and when the camera and equipment is taken to a scene of activity, even in another studio, the associated tape control, the camera and the monitor, have their sync energy already on the tape which also serves its purpose when the material is broadcast over the television station, namely, that of self synchronization of the movement of the tape and of the electronic functions normally performed by the station's synchronizing signals. This feature comprises a part of my invention, since synchronizing generating equipment is not required, the same as with pre-printed magnetizable lines on the tape, to operate portable or studio equipment equipped to utilize pre-printed or pre-recorded synchronous prepared tape.

With either pre-printed or pre-printed synchronizing and drive signals on the tape, the weight of associated equipment that is required on planes and field equipment by the armed forces to supply first rate television or telefacsimile pictures to be readily and easily reproduced with a minimum of equipment at a headquarter location is reduced.

It is also a part of the invention to provide a record-readout gap having extended recording area, even to the extent of two sharp edges of a horse shoe electromagnet whereby one pole piece is below the tape with the other pole piece above the tape and adapted to operatively bridge the magnetizable lines on the tape in the manner illustrated.

The utilization of all phases of the present invention, or parts thereof are numerous, and all portions of the invention set forth, described, exemplified and broadly claimed hereinafter, I consider to be encompassed in my invention.

I claim:

1. An electromagnetic transducer having an extended recording gap area comprising a multiplicity of partial horse shoe magnet spaces within the area opposite to said gap and joined in parallel magnetic relationship to both edges of said gap, each having an energizing coil and all connected to be simultaneously energized, an equalizing means to produce substantially equal magnetic flux transfer at all points along said gap resulting from electric wave energy applied thereto, and a non-magnetic separation medium affixed between the edges of said extended recording gap area.

2. In a magnetic record-readout system, means comprising a non-magnetic tape with straight magnetic material lines mounted transversely thereon, electromagnetic transducer means having a razor sharp elongated edge forming one pole piece of a recording gap and placed below said tape, the other pole piece of said electromagnetic transducer means having a razor sharp elongated edge and placed above said tape, said pole piece edges positioned to angularly traverse one of said lines by longitudinal tape movement but before leaving same said edges of said gap have begun to traverse the next one of said lines to provide recording and readout continuity as the said tape moves longitudinally between said first and second elongated recording gap edges.

3. A system of magnetic recording comprising means for travelling and tension controlling a recording tape in operative relationship to a magnetic transducer having a magnetic gap, said transducer having an extended recording gap area comprising a multiplicity of partial horse shoe magnet spaces within the area opposite to said gap and joined in parallel magnetic relationship to both edges of said gap each having an energizing coil and all of said coils simultaneously energized, said recording media comprising a reelable tape having straight magnetizable parallel lines affixed transversely on said tape and non-magnetic spaces between said lines, said gap of said transducer positioned at an angle from a central pivot point crosswise of said tape to operatively engage one of said parallel magnetizable lines with both edges of said gap and before severance of engagement therewith due to tape travel, the next magnetizable line on the said tape has begun to be traversed by said gap of said transducer providing a simulated endless magnetic recording media having a total length many times longer than the physical length of said tape.

References Cited in the file of this patent

UNITED STATES PATENTS

| | | |
|---|---|---|
| 2,165,307 | Skellett | July 11, 1939 |
| 2,188,650 | Clark | Jan. 30, 1940 |
| 2,412,551 | Pratt et al. | Dec. 10, 1946 |
| 2,604,321 | Williams | July 22, 1952 |
| 2,607,847 | Heisig | Aug. 19, 1952 |
| 2,697,754 | Ranger | Dec. 21, 1954 |

| | | |
|---|---|---|
| 2,773,120 | Masterson | Dec. 4, 1956 |
| 2,782,043 | Andrews | Feb. 19, 1957 |
| 2,818,464 | Sziklai | Dec. 31, 1957 |
| 2,876,295 | Irby | Mar. 3, 1959 |
| 2,906,827 | Gordon | Sept. 29, 1959 |
| 2,907,818 | Wetzel | Oct. 6, 1959 |
| 2,918,656 | Nolde et al. | Dec. 22, 1959 |
| 2,921,989 | Serrell | Jan. 19, 1960 |
| 2,933,555 | Wootten | Apr. 19, 1960 |
| 2,955,169 | Stedtnitz | Oct. 4, 1960 |
| 2,957,043 | Kihn | Oct. 18, 1960 |
| 2,976,354 | Banning | Mar. 21, 1961 |
| 3,092,296 | Andrews | June 4, 1963 |

OTHER REFERENCES

RCA TN No. 6, Aug. 9, 1957.